United States Patent [19]

Keoshkerian et al.

[11] Patent Number: 5,891,971
[45] Date of Patent: Apr. 6, 1999

[54] POLYMERIZATION PROCESSES

[75] Inventors: Barkev Keoshkerian, Thornhill; Marion H. Quinlan, Mississauga; Michael K. Georges, Guelph; H. Bruce Goodbrand, Hamilton, all of Canada

[73] Assignee: Xerox Corporation, Stamford

[21] Appl. No.: 911,623

[22] Filed: Aug. 15, 1997

[51] Int. Cl.$^6$ .............................. C08F 2/00; C08F 287/00
[52] U.S. Cl. .................. 526/210; 526/212; 526/263; 526/328; 526/319; 526/316; 526/335; 526/344; 526/346; 525/253
[58] Field of Search ..................... 526/212, 210, 526/263, 316, 319, 328, 335, 344, 346; 525/253

[56] References Cited

U.S. PATENT DOCUMENTS

| | | | |
|---|---|---|---|
| 4,581,429 | 4/1986 | Solomon et al. | 526/220 |
| 5,322,912 | 6/1994 | Georges et al. | 526/204 |
| 5,412,047 | 5/1995 | Georges et al. | 526/204 |
| 5,530,079 | 6/1996 | Veregin et al. | 526/219.3 |

*Primary Examiner*—Jeffrey T. Smith
*Assistant Examiner*—Wu C. Cheng
*Attorney, Agent, or Firm*—John L. Haack

[57] ABSTRACT

A process for the preparation of a resin comprising:
heating a mixture of at least one free radical polymerizable monomer, a free radical initiator compound, a stable free radical compound, and a reducing agent.

23 Claims, No Drawings

POLYMERIZATION PROCESSES

REFERENCE TO COPENDING AND ISSUED PATENTS

Attention is directed to commonly owned and assigned U.S. Pat. No. 5,322,912, issued Jun. 21, 1994, entitled "POLYMERIZATION PROCESSES AND THEIR TONER COMPOSITIONS THEREFROM"; U.S. Pat. No. 5,412,047, issued May 2, 1995, entitled "HOMOPOLYMERIZATION PROCESSES WITH OXONITROXIDES"; U.S. Pat. No. 5,401,804, issued Mar. 28, 1995, which is a divisional application of U.S. Pat. No. 5,322,912, entitled "POLYMERIZATION PROCESS AND TONER COMPOSITIONS THEREFROM"; U.S. Pat. No. 5,449,724, issued Sep. 12, 1995, entitled "STABLE FREE RADICAL POLYMERIZATION PROCESS AND THERMOPLASTIC MATERIALS PRODUCED THEREFROM"; U.S. Pat. No. 5,498,679, (D/95112), issued Mar. 12, 1996, entitled "PROCESS FOR PRODUCING BRANCHED AND STAR THERMOPLASTIC RESIN POLYMERS"; U.S. Pat. No. 5,549,998, issued Jul. 27, 1996, a divisional application of U.S. Pat. No. 5,322,912 and 5,401,804, entitled "POLYMERIZATION PROCESSES AND TONER COMPOSITIONS THEREFROM"; U.S. Pat. No. 5,545,504, issued Jul. 13, 1996, entitled "INK JETTABLE TONER COMPOSITIONS AND PROCESSES FOR MAKING AND USING"; U.S. Pat. No. 5,530,079, issued Jun. 26, 1996, entitled "POLYMERIZATION PROCESSES"; U.S. Pat. No. 5,552,502, issued Sep. 3, 1996, entitled "POLYMERIZATION PROCESSES"; and U.S. Pat. No. 5,608,023, issued Mar. 4, 1997, entitled "RATE ENHANCED POLYMERIZATIONS".

Attention is directed to commonly owned and assigned copending applications Application Numbers, U.S. Ser. No. 08/307,192 (D/92581), filed Mar. 25, 1993, entitled "SEMISUSPENSION POLYMERIZATION PROCESSES"; U.S. Ser. No. 08/214,518 (D/92579 I), filed Mar. 18, 1994, entitled "EMULSION POLYMERIZATION PROCESSES AND TONER COMPOSITIONS THEREFROM", a continuation-in-part of U.S. Ser. No. 07/976,604, filed Nov. 16, 1992; U.S. Ser. No. 08/223,418 (D/93729), filed Apr. 4, 1994, entitled "AQUEOUS POLYMERIZATION PROCESSES"; U.S. Ser. No. 08/292,670 (D/94133), filed Aug. 18, 1994, entitled "BIFUNCTIONAL MACROMOLECULES AND TONER COMPOSITIONS THEREFROM"; U.S. Ser. No. 5 08/345,371 (D/94743), filed Nov. 18, 1994, entitled "POLYMERIZATION PROCESSES; U.S. Ser. No. 08/348,022 (D/94772), filed Dec. 1, 1994, entitled "POLYMERIZATION MULTIBLOCK COPOLYMER PROCESS AND COMPOSITIONS THEREOF"; U.S. Ser. No. 08/348021 (D/94635), filed Dec. 12, 1994, entitled "POLYMERIZATION PROCESS AND COMPOSITIONS THEREOF"; U.S. Ser. No. 08/413,752 (D/95071), filed Mar. 30, 1995, entitled "STABLE FREE RADICAL POLYMERIZATION UNDER SUPERCRITICAL CONDITIONS AND POLYMERS PRODUCED THEREBY"; U.S. Ser. No. 08/413,645 (D/94136), filed Mar. 30, 1995, entitled "PROCESSES FOR THE PREPARATION OF BRANCHED POLYMERS"; U.S. Ser. No. 08/553,200 (D/95421), filed Nov. 7, 1995, entitled "POLYMERIZATION PROCESSES"; U.S. Ser. No. 08/664,702 (D/95639), filed Jun. 19, 1996, entitled "PROCESSES FOR PREPARING TELECHELIC, BRANCHED AND STAR THERMOPLASTIC RESIN POLYMER"; and U.S. Ser. No. 08/not yet assigned (D/96682), filed not yet assigned, 1997, entitled "PROCESS FOR THE PREPARATION OF POLYMERS".

The disclosures of each the above mentioned patents and copending applications are incorporated herein by reference in their entirety. A number of the components and reaction parameters of the above patents may be selected for the processes of the present invention in embodiments thereof.

BACKGROUND OF THE INVENTION

The present invention is generally directed to a polymerization processes for the preparation of narrow polydispersity homopolymers and copolymers and which polymerization processes are facilitated and mediated by stable free radical agents. More specifically, the present invention relates to improved reliabilities, enhanced rates, and reduced costs in stable free radical mediated polymerization processes for obtaining homopolymers and copolymers, such as block, multiblock, graded or tapered, and branching copolymers containing a variety of known free radical polymerizable monomers and which polymers and copolymers have narrow molecular weight distribution properties and are obtained in high conversions. Even more specifically, the present invention relates to improved free radical polymerization processes that use, in embodiments, and least one free radical polymerizable monomer, and in embodiments, for 1 to about 10 different monomers, a conventional free radical initiator compound, a stable free radical compound, and a reducing agent, for example, a reducing sugar such as glucose, and the like compounds, to obtain the aforementioned polymer and copolymer products. In embodiments of the present invention, the polymerization process can be accomplished wherein the free radical initiator compound and the stable free radical compound are separate entities, or alternatively, combined into a single molecular entity or an initiator adduct, such as a "unimer" or an oligomer, that is, a compound containing both a "masked" free radical initiator species and a covalently bonded and thermally labile, in a reversibly dissociable sense, stable free radical moiety. Thermal decomposition of the initiator adduct, as in the "unimer" or the oligomer, liberates the free radical initiator component and the stable free radical component into the polymerization reaction mixture. From detailed kinetic and mechanistic studies of stable free radical mediated polymerization processes it is known that excess amounts of the stable free radical agent, while useful in substantially controlling thermal polymerization and polydispersity broadening processes, can provide a source of substantial inhibition, or at least retardation of the rate of monomer polymerization. Thus, in embodiments, it is desirable to maintain a balanced or low steady state concentration of the "free" or liberated stable free radical agent and at a level which is capable of substantially inhibiting undesirable pathways, such as premature and irreversible polymer chain termination, disproportionation, interchain coupling, and the like processes, while leaving unimpeded productive polymerization pathways. The reducing agent is believed to accomplish the desired balanced condition by chemically reducing excess amounts of stable free radical compound and thereby enabling acceleration of the overall rate of stable free radical mediated polymerization processes.

The present invention relates to processes for the preparation of polymers, and more specifically to stable free radical mediated free radical polymerizations and copolymerizations, and to polymeric resins formed thereby. In embodiments, the present invention relates to a stable free radical moderated polymerization and copolymerization process for producing a thermoplastic polymer resin or resins, that have narrow polydispersities, that is, narrow molecular weight distributions as defined by the ratio Mw:Mn, where Mw is weight average molecular weight of the polymer and Mn is number average molecular weight of the polymer, with an easily controllable modality, from at least one free radical polymerizable monomer compound comprising:

heating a mixture of at least one free radical polymerizable monomer, a free radical initiator compound, a stable free radical compound, and a reducing agent additive, wherein there results a thermoplastic resin or thermoplastic resins with a narrow polydispersity, for example, of from about 1.1 to about 2.2 and in high conversions, for example, of from about 50 to 100 percent;

cooling the mixture to effectively terminate the polymerization; optionally isolating the thermoplastic resin product; and optionally washing and drying the polymer resin products.

In another embodiment polymeric chain growth proceeds by a pseudoliving mechanism and can provide resins of variable molecular weights (Mw) from very low to very high, for example, less than about 10,000 up to about 200,000, and more specifically from about 8,000 to about 200,000, while maintaining narrow molecular weight distributions or polydispersities. In another embodiment block and multiblock copolymers can be synthesized by the aforementioned stable free radical moderated polymerization processes wherein each block formed is well defined in length by the added and reacted monomer and wherein each additional block that is formed also possesses a narrow molecular weight distribution.

The present invention is directed to polymerization processes which permit the economic preparation of narrow polydispersity resins with low, intermediate, or high molecular weights. The low molecular weight resins can be prepared without a chain transfer agent or molecular weight modifier which provides several advantages over conventional polymerization processes as illustrated herein.

The stable free radical mediated polymerization system of the present invention s can readily afford narrow polydispersities, in embodiments, of from about 1.05 to about 2.0 for homopolymers, and in embodiments, of from about 1.1 to about 1.6, and as low as 1.5 or below for various copolymer systems. Stable free radical mediated polymerization systems of the present invention afford resin polydispersities that are comparable to those obtained in anionic polymerizations.

PRIOR ART

In the aforementioned commonly owned and assigned U.S. Pat. No. 5,322,912, there is disclosed free radical polymerization processes for the preparation of a thermoplastic resin or resins comprising: heating from about 1000° C. to about 1600° C. a mixture comprised of a free radical initiator, a stable free radical agent, and at least one polymerizable monomer compound to form the thermoplastic resin or resins with a high monomer to polymer conversion and a narrow polydispersity.

In the aforementioned commonly owned and assigned U.S. Pat. No. 5,412,047, there is illustrated stable free radical moderated polymerization processes which employ an oxo nitroxide compound which enable the controlled homopolymerization of acrylate and related monomer compounds.

U.S. Pat. No. 4,581,429 to Solomon et al., issued Apr. 8, 1986, discloses a free radical polymerization process which controls the growth of polymer chains to produce short chain or oligomeric homopolymers and copolymers including block and graft copolymers. The process employs an initiator having the formula (in part) =N—O—X, where X is a free radical species capable of polymerizing unsaturated monomers. The molecular weights of the polymer products obtained are generally from about 2,500 to 7,000 having polydispersities generally of about 1.4 to 1.8, at relatively low monomer to polymer conversion. The reactions typically have low conversion rates and use relatively low reaction temperatures of less than about 100° C., and use multiple stages.

European Patent Publication No. 0135280 corresponding to European Patent Application No. EP 84 304,756 is the European Patent Office equivalent of the aforementioned U.S. Pat. No. 4,581,429.

The aforementioned prior art references are incorporated herein in their entirety by reference.

In polymerization reaction processes of the prior art, various significant problems exist, for example difficulties in predicting or controlling both the polydispersity and modality of the polymers produced.

The prior art polymerization processes produce polymers with high weight average molecular weights (Mw) and low number average molecular weights (Mn) resulting in broad polydispersities or low molecular weight (Mn) and low conversion. Further, polymerization processes of the prior art are prone to generating excessive quantities of heat since the polymerization reaction is exothermic and as the viscosity of the reaction medium increases dissipation of heat becomes more difficult. This is referred to as the Trommsdorff effect as discussed and illustrated in Principles of Polymerization, G. Odian, 2nd Ed., Wiley-lnterscience, N.Y., 1981, page 272, the disclosure of which is entirely incorporated herein by reference. Moreover, the exothermic nature of free radical emulsion polymerization processes is often a limitation that severely restricts the concentration of reactants or the reactor size upon scale up.

These and other disadvantages are avoided, or minimized with the stable free radical polymerization processes of the present invention.

Thus, there remains a need for polymerization processes for the preparation of narrow polydispersity polymeric resins by economical and scalable free radical polymerization techniques and which polymeric resins retain many or all of their desirable physical properties, for example, hardness, low gel content, processability, clarity, high gloss durability, and the like, while avoiding the problems of long reaction times, gel formation, exotherms, volume limited and multistage reaction systems, purification, performance properties of the polymer resin products, and the like associated with prior art free radical polymerization methodologies.

The polymerization processes and thermoplastic resin products of the present invention are useful in many applications, for example, a variety of specialty applications including toner resins used for electrophotographic imaging processes, in thermoplastic films, dispersants, and coating technologies.

These and other advantages are provided with the processes of the present invention.

Thus, there remains a need for stable free radical polymerization processes which provide thermoplastic resin or thermoplastic resins with a narrow polydispersity of from about 1.1 to about 2.0, in high conversion, for example, of from about 50 to 100 percent, wherein the polymerization rates are improved, and wherein the polymerization reaction times are reduced.

SUMMARY OF THE INVENTION

Embodiments of the present invention, include:

overcoming, or minimizing deficiencies of prior art processes, by providing processes with improved efficiency, improved flexibility, and improved operational economies;

providing a process for the preparation of a resin comprising: heating a mixture of at least one free radical polymerizable monomer, a free radical initiator compound, a stable free radical compound, and a reducing agent.

providing a process for the preparation of a resin, especially a thermoplastic resin, or thermoplastic resins comprising: heating a mixture of at least one free radical polymerizable monomer, a free radical initiator compound, a stable free radical compound, and a reducing agent additive, wherein there results a thermoplastic resin or thermoplastic resins with a narrow polydispersity of from about 1.1 to about 2.2, preferably from about 1.1 to about 1.5 and in high conversion of from about 50 to 100, and preferably from about 70 to about 90 percent;

providing a process for the preparation of a thermoplastic resin, or thermoplastic resins comprising: heating a mixture of at least one free radical polymerizable monomer, a thermally labile unimer or oligomer initiator compound comprising a free radical initiator component and a stable free radical component, and a reducing agent additive, wherein there results a thermoplastic resin or thermoplastic resins; and providing stable free radical mediated polymerization processes for the preparation of block and multiblock copolymer thermoplastic resins comprising: heating a mixture of at least one free radical polymerizable monomer, a free radical initiator compound, a stable free radical compound, and a reducing agent additive, to form a first intermediate product resin; and thereafter repeatedly reacting the resulting product with successively added monomers which monomers are different from the previously polymerized monomer to form well defined block and multiblock copolymer thermoplastics.

DETAILED DESCRIPTION OF THE INVENTION

The stable free radical mediated polymerization processes of the present invention may be used to process and prepare a variety of polymeric materials, including those used in toner particles for liquid and dry developer marking applications in a cost efficient manner. Advantages of the present invention include polymerization processes which afford precise control over the molecular weight and molecular weight distribution properties of the resulting polymer products.

In embodiments, the present invention provides a process for the preparation of a resin comprising:

heating a mixture of at least one free radical polymerizable monomer, a free radical initiator compound, a stable free radical compound, and a reducing agent.

In embodiments, the present invention provides a process for the preparation of a thermoplastic resin, or thermoplastic resins comprising:

heating a mixture of at least one free radical polymerizable monomer, a free radical initiator compound, a stable free radical compound, and a reducing agent additive, wherein there results a thermoplastic resin or thermoplastic resins with a narrow polydispersity of from about 1.1 to about 2.2 and in high conversion of from about 50 to 100 percent.

The reducing agent, which can be present in various amounts, for example from about 0.1 to about 5.0 weight percent, and preferably from about 0.5 to about 3.0 weight percent based on the weight of the monomer polymerized, includes any suitable compound which is capable of chemical reducing excess stable free radical compounds at a sufficiently fast rate so that the stable free radical compounds are unable to exert an inhibitory effect on the rate of monomer polymerization. Although not wanting to be limited by theory, it is believed that the reducing agent additive provides superior monomer polymerization results, particularly with respect to the time of reaction and the extent of polymerization or conversion with respect to time, as illustrated herein in the Examples and as contrasted in the Comparative Example. It is also believed that the reducing agent functions as a stable free radical mediated polymerization rate enhancing or rate promoting compound. The reducing agent additive is believed to possess at least some ene-diol tautomeric structural character, for example, the cis or trans isomer, of the formula

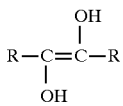

wherein R is independently selected from the group consisting of hydrogen, alkyl groups with from 1 to about 25 carbon atoms and preferably from 1 to about 10 carbon atoms, alkylene groups with 2 to about 25 carbon atoms and preferably from 2 to about 10 carbon atoms, aryl groups with from about 6 to about 24 carbon atoms and preferably from 6 to about 10 carbon atoms, heteroaryl groups with from about 5 to about 25 carbon atoms and preferably from 5 to about 10 carbon atoms; alkoxyl groups with from 1 to about 25 carbon atoms and preferably from 1 to about 10 carbon atoms, and combinations or mixtures thereof. The reducing agent preferably contains at least one enolizable alpha-hydroxy carbonyl moiety, for example, such as an alpha-hydroxy aldehyde or ketone. In embodiments, the reducing agent additive can be a reducing sugar compound capable of reducing Fehling's solution, for example, such as pentoses including fructose, xylose, L-arabinose, and the like, and hexoses, such as glucose, maltose, or organic solvent soluble sugars such as 2,3,4,6-tetra-O-benzyl-D-glucopyranose, and mixtures thereof, which possess ene-diol and reducing potential. The reducing agent additive can be a compound other than a simple or reducing sugar, for example, benzoin of the formula $C_6H_5$—(C=O)—CH(OH)—$C_6H_5$ which compound possesses both ene-diol tautomeric structural character and reducing potential. Other non sugar reducing agent compounds include, enolizable alpha-hydroxy carbonyl compounds such as hydroxybutanone and acetol. In embodiments, the reducing agent can be an attenuated hydride compound or mixtures thereof, reference for example, H. O. House, "*Modern Synthetic Reactions*", 2nd Ed., W. A. Benjamin, Inc., 1972, the disclosure of which is incorporated herein in its entirety by reference.

Attenuated hydride compounds include organometallic hydride compounds, for example 9-borobicycloborane, diisopropylaluminum hydride, or sodium bis(2-methoxyethoxy)aluminum hydride, available commercially (Aldrich Chemical Co.) as a 65+ weight percent solution in toluene as RED-AL®, and mixtures thereof.

In embodiments the polymerization processes of the present invention further comprise including a base or buffering salt compound in the polymerization reaction mixture, such as Group IA and IIA metal halides, metal carbonates and bicarbonates, phosphates, sulfates, hydroxides, acetates, borates, and mixtures thereof. The buffering compound can be, for example, a sodium bicarbonate salt in an amount of from about 0.1 weight percent to about 5 weight based on the total weight of monomer polymerized. In embodiments, the buffering compound can also be used in amounts of from about 0.1 weight percent to about 3 weight percent based on the total weight of the reducing agent. The function of the base or buffering compound in the polymerization processes of the present invention is believed to be, for example, to provide buffering action and capacity to remove acidic or basic materials from the reaction mixture, which materials may cause undesirable side reactions, interfere or destroy reactants or reagents, or otherwise inhibit the polymerization process.

In embodiments of the present invention the free radical initiator can be any water insoluble or water soluble free radical initiator compound, such as, sulfites, peroxides, peroxydisulfates, azo compounds, and like compounds, and mixtures thereof, for example: sodium persulfate; potassium persulfate; ammonium persulfate; hydrogen peroxide; t-butyl hydroperoxide; cumene hydroperoxide; paramenthane hydroperoxide and peroxy carbonates; 4,4'-azobis (4-cyanovaleric acid); 1,1'-azobis(1-methylbutyronitrile-3-sodium sulfonate); 2,2'-azobis(2-amidinopropane) dihydrochloride; 2,2'-azobis(2-amidinopropane) dihydrochloride; 2,2'-azobisisobutyl amide dihydrate; 2,2'-azobis[2-(2-imidazolin-2-yl)propane]dihydrochloride; 2,2'-azobis[2-(5-methyl-2-imidazolin-2-yl) propane] dihydrochloride; and mixtures thereof.

A preferred initiator is one which has a one-hour half-life at about 60° to 90° C. and a ten-hour half-life at about 50° to 80° C. Other peroxides, such as peresters and peracids having somewhat higher one-hour half-life/temperature relationships, may also be used if they are accompanied by a promoter compounds such as tertiary amine, for example: 2,4-dimethyl-2,5-dibenzyl peroxyhexane.

When a free radical initiator compound is selected as the initiator component in forming the oligomeric compound of the present process, it can be any free radical polymerization initiator capable of initiating a free radical polymerization process and forming the oligomeric compound, and includes peroxide initiators such as benzoyl peroxide and azo initiators such as azobisisobutyronitrile, and the like. The initiator concentration employed in forming the oligomeric compound, for example, is about 0.2 to 2.5 weight percent, of the total weight of monomer to be polymerized and is determined by the desired molecular weight and structure of the oligomer and the desired resin. As the initiator concentration is decreased relative to the weight of molar equivalents of monomer used, the molecular weight of the thermoplastic resin product increases.

Suitable monomer compounds can be acrylate compounds, alkacrylate compounds, styrene compounds, such as methyl styrene, conjugated and unconjugated diene compounds, such as butadiene, isoprene, myrcene, conjugated olefin-carbonyl compounds, such as methyl vinyl ketone, 9-vinyl carbazole compounds, vinyl chloride compounds, vinyl acetate compounds, and mixtures thereof. More specifically the monomer can be styrene, alkyl substituted styrenes with from 1 to about 20 carbon atoms and preferably from 1 to about 10 carbon atoms, alkyl methacrylate, and the like compounds, and mixtures thereof.

In embodiments, from about 2 to about 10 different monomers can be polymerized, for example, simultaneously in the same mixture to afford random or graded copolymers depending upon the relative reactivity of the monomers, or sequentially, for example, in the preparation of block and multiblock copolymers. The monomers that can be used are any monomer capable of undergoing a free radical polymerization and include but are not limited to styrene compounds, such as substituted styrenes, for example methylstyrene and the like compounds, acrylates, methacrylates, butadiene and any conjugated diene monomer sufficiently reactive under the specified stable free radical moderated polymerization reaction conditions to afford a stable free radical reaction adduct and high molecular weight polymer product, for example, isoprene and myrcene. Other monomers include for example 9-vinyl carbazole compounds, vinyl chloride compounds, vinyl acetate compounds, and mixtures thereof including the above mentioned monomers and the polymerizable monomers recited below for suitable toner resins.

The stable free radical compound can be any compound which thermally and reversibly traps free radical species, particularly those of propagating polymer chains in free radical initiated polymerizations. The stable free radical agent can be any stable free radical and includes nitroxide free radicals, for example, PROXYL (2,2 5,5-tetramethyl-1-pyrrolidinyloxy) compounds, DOXYL (4,4-dimethyl-3-oxazolinyloxy) compounds, and TEMPO (2,2,6,6-tetramethyl-1-piperidinyloxy) compounds, 4,4-dimethyl-3-oxazolinyloxy compounds, di-tertiary alkyl substituted nitroxide compounds, and the like compounds, and mixtures thereof. Other -SFR groups and compounds are illustrated in the appropriate U.S. patents recited herein, such as non-nitroxyl compounds disclosed in U.S. Pat. No. 5,530,079, the disclosure of which is incorporated herein in its entirety by reference. These stable free radical agent materials are well known in the literature as free radical polymerization inhibitors, see for example, G. Moad et. al., *Tetrahedron Letters*, 22, 1165 (1981). The stable free radical agents are preferably soluble in the monomer phase where predominantly all the polymerization of monomers occurs. Stable free radical agents which have heterophase solubility are still useful, but may result in less predictable polymerization processes compared to those where the stable free radical agent is in the same phase as the monomer.

The molar ratio of the stable free radical (SFR) agent to free radical initiator (INIT) residing in the same phase is, for example, from about 0.4 to 2.5, and preferably in the range from about 0.9 to 1.6. Although not wanting to be limited by theory, in an embodiment, the molar ratio [SFR:INIT.] of stable free radical agent, for example, TEMPO, to free radical initiator, for example, benzoyl peroxide, of about 1.3 is believed to be important for success of the process. If the [SFR:INIT.] is too high then the reaction rate is noticeably inhibited. If the [SFR:INIT.] is too low then the reaction product has undesired increased polydispersity.

In embodiments, the molar ratio of monomer content to stable free radical agent to free radical initiator is, for example, from about 100:0.2:1 to about 10,000:2.5:1 and preferably in the range of about 300:1.3:1 to about 7,000:1.3:1.

In embodiments, the mole ratio of reducing agent to free radical initiator is from about 1:1 to about 10:1, more preferably from about 2:1 to about 5:1, and most preferably from about 2:1 to about 3:1.

The heating of the polymerization reaction mixture can be accomplished by any conventional method, for example, immersion of the polymerization reaction vessel in a thermostated oil bath at a temperature of, for example, from about 100° to about 200° C. for from, for example, about 1 to about 40 hours. In preferred embodiments, the heating can be at a temperature of from about 120° to about 165° C. for from about 1 to about 5 hours, where the resulting monomer to polymer conversion can be from about 65 to 95 percent, and the polydispersity is from about 1.3 to about 2.0. The optimal reaction time may vary depending upon the temperature, the volume and scale of the reaction, and the quantity and type of polymerization initiator and stable free radical agent selected.

The weight average molecular weight ($M_w$) of the resulting thermoplastic resins of the present invention can be, for example, from about 3,000 to about 200,000, for homopolymers and from about 5,000 to about 600,000 for block and multiblock copolymers. In embodiments a preferred weight average molecular weight ($M_w$) of the resin is from about 10,000 to about 180,000.

When the free radical initiator compound embodies both a free radical initiator compound and a stable free radical compound, that is when the free radical initiator and the stable free radical compound are integrated within in the same molecule the weight ratio of combined free radical initiator and stable free radical compound to monomers is, for example, from about 0.001:100 to 1.0:1.0.

In embodiments, the present invention provides a process for the preparation of a thermoplastic resin, or thermoplastic resins comprising:

heating a mixture of at least one free radical polymerizable monomer, a free radical initiator compound containing or integrating a covalently bonded stable free radical agent, and a reducing agent additive, wherein there results a thermoplastic resin or thermoplastic resins with a narrow polydispersity of from about 1.1 to about 2.0 and in high conversion of from about 50 to 100 percent. In embodiments, the free radical initiator compound can be of the formula R'—SFR, wherein R' is an oligomeric compound comprised of from about 1 to about 30 monomer units and optionally a covalently bonded free radical initiator compound, and wherein —SFR is a covalently bound stable free radical group. In embodiments, the free radical initiator adduct compound R'—SFR can be, for example, N-(1-methylbenzyl)-oxy-2,2,6,6-tetramethyl-1-piperidine (MB-TMP) of the formula

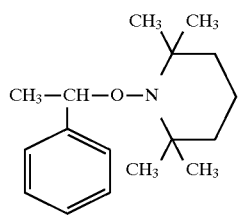

In embodiments, the free radical initiator adduct compound R'—SFR can be an oligomeric compound, for example, of the formula

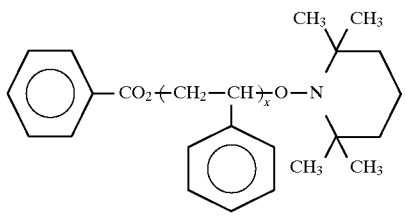

wherein x is an integer of from 1 to about 30. The covalently bonded stable free radical end group —SFR can arise from, for example, a stable free radical compound such as 2,2,5,5-tetramethyl-1-pyrrolidinyloxy compounds, 2,2,6,6-tetramethyl-1-piperidinyloxy compounds, 4,4-dimethyl-3-oxazolinyloxy compounds, di-tertiary alkyl substituted nitroxide compounds, and the like compounds, and mixtures thereof. In other embodiments, it is desirable to select an oligomeric initiator compound containing one or more —SFR groups, for example, di-, tri-, tetra-, and the like, functionalized oligomeric initiators, reference for example, the aforementioned copending U.S. Ser. No. 08/292,670 (D/94133), wherein there is disclosed bifunctional initiators and oligomers thereof that are suitable for use in the present invention, reference also the aforementioned copending U.S. Ser. No. 08/413,645 (D/94136) and U.S. Ser. No. 08/664,702 (D/95639) and which applications disclose compounds and methods for the preparation of multifuntioned branched polymers, which compounds and methods are believed applicable to the preparation of oligomeric initiator compounds of the present invention.

In an illustrative embodiment, the present invention provides a process for the preparation of a thermoplastic resin, or thermoplastic resins comprising:

heating a mixture of alkyl acrylate free radical polymerizable monomer and non-acrylate free radical polymerizable monomer, a free radical initiator compound containing an integral and covalently bonded stable free radical compound, for example, of the formula

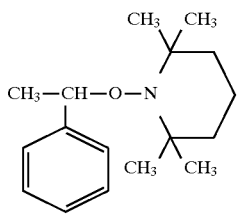

and a reducing agent additive such as glucose, an optionally a basic compound, wherein there results a thermoplastic resin copolymer of the alkyl acrylate and non acrylate monomers with a narrow polydispersity of from about 1.1 to about 2.2 and in high conversion of from about 50 to 100 percent.

In embodiments, the present invention provides a process for the preparation of a block or multiblock copolymer thermoplastic resins comprising:

heating a mixture of a free radical polymerizable monomer, a free radical initiator compound, a stable free radical compound which separate and apart from the free radical initiator compound or is integral therewith, and a reducing agent, to form a mixture containing a first intermediate product resin, optionally cooling the resulting mixture;

optionally isolating said first intermediate product resin from the mixture;

adding to said first intermediate product resin a second mixture comprised of at least one free radical polymerizable monomer compound, and optionally a reducing agent, wherein said polymerizable monomer compound of said second mixture is different from said polymerizable monomer or monomers of said first mixture, to form a combined second mixture;

heating said combined second mixture to form a third mixture comprised of a block copolymer thermoplastic resin comprised of a first product resin formed from said first intermediate product resin and added said second monomer;

cooling the resulting third mixture;

optionally isolating the resin from said third mixture;

sequentially repeating the preceding three steps of adding, heating and cooling, N times, wherein N represents a number, to form a fourth mixture containing a multiblock copolymer thermoplastic resin or resins having N+2 blocks and wherein N is the number of times said sequence is repeated;

optionally isolating said multiblock copolymer thermoplastic resin from said fourth mixture; and optionally washing and drying said multiblock copolymer thermoplastic resin and wherein said multiblock copolymer thermoplastic resin possesses a narrow polydispersity and a modality of 1.

In embodiments, N in the aforementioned block or multiblock polymerization process can be from 1 to about 20.

In embodiments, polymerization processes of the present invention further comprises isolating and purifying the product polymer from the reaction mixture. Separating the polymer product can be accomplished by conventional methods, such as, filtration, sedimentation, spray drying, and the like.

The polymeric products of the present invention may be optionally crosslinked with, for example, known crosslinking or curing agents such as divinyl benzene and the like, either in situ or in a separate post polymerization process step.

Additional optional known additives may be used in the polymerization reactions which do not interfere with the objects of the invention and which may provide additional performance enhancements to the resulting product, for example, colorants, lubricants, release or transfer agents, surfactants, stabilizers, antifoams, antioxidants, and the like.

In embodiments, there can be incorporated into the monomer before or during the polymerization process a waxy component, such as alkylenes, like polyethylene, polypropylene waxes, and mixtures thereof having a low molecular weight of from between about 1,000 to about 20,000 in amounts of from about 0.1 to about 15 weight percent of the total monomer polymerized. Alternatively, the waxy component may be added to the isolated polymeric product of the process. The use of such a component may be desirable for certain toner applications. Suitable low molecular weight waxes are disclosed in U.S. Pat. No. 4,659,641, the disclosure of which is totally incorporated herein by reference.

The present invention, in embodiments, encompasses developer compositions comprised of coated carrier particles comprising a core with a coating thereover comprised of at least one polymer, and a toner composition comprised of toner resin particles and colorant, especially pigment particles.

Toner compositions can be prepared by a number of known methods, such as admixing and heating resin particles such as styrene-butadiene copolymers, colorant particles such as magnetite, carbon black, or mixtures thereof, and cyan, yellow, magenta, green, brown, red, or mixtures thereof, and preferably from about 0.5 percent to about 5 percent of charge enhancing additives in a toner extrusion device, such as the ZSK53 available from Werner Pfleiderer, and removing the formed toner composition from the device. Subsequent to cooling, the toner composition is subjected to grinding utilizing, for example, a Sturtevant micronizer for the purpose of achieving toner particles with a volume median diameter of less than about 25 microns, and preferably of from about 6 to about 12 microns, which diameters are determined by a Coulter Counter. Subsequently, the toner compositions can be classified utilizing, for example, a Donaldson Model B classifier for the purpose of removing toner fines, that is toner particles less than about 4 microns volume median diameter. Alternatively, the toner compositions are ground with a fluid bed grinder equipped with a classifier wheel and then classified.

Illustrative examples of resins suitable for toner and developer compositions of the present invention include linear or branched styrene acrylates, styrene methacrylates, styrene butadienes, vinyl resins, including linear or branched homopolymers and copolymers of two or more vinyl monomers; vinyl monomers include styrene, p-chlorostyrene, butadiene, isoprene, and myrcene; vinyl esters like esters of monocarboxylic acids including methyl acrylate, ethyl acrylate, n-butyl acrylate, isobutyl acrylate, dodecyl acrylate, n-octyl acrylate, phenyl acrylate, methyl methacrylate, ethyl methacrylate, and butyl methacrylate; acrylonitrile, methacrylonitrile, acrylamide; and the like. Preferred toner resins include styrene butadiene copolymers, mixtures thereof, and the like. Other preferred toner resins include styrene/n-butyl acrylate copolymers, PLIOLITES®; suspension polymerized styrene butadienes, reference U.S. Pat. No. 4,558,108, the disclosure of which is totally incorporated herein by reference.

In the toner compositions, the resin particles are present in a sufficient but effective amount, for example from about 70 to about 90 weight percent. Thus, when 1 percent by weight of the charge enhancing additive is present, and 10 percent by weight of pigment or colorant, such as carbon black, is contained therein, about 89 percent by weight of resin is selected. Also, the charge enhancing additive may be coated on the pigment particle. When used as a coating, the charge enhancing additive is present in an amount of from about 0.1 weight percent to about 5 weight percent, and preferably from about 0.3 weight percent to about 1 weight percent.

Numerous well known suitable colorants, such as pigments or dyes can be selected as the colorant for the toner particles including, for example, carbon black like REGAL 330®, nigrosine dye, aniline blue, magnetite, or mixtures thereof. The pigment, which is preferably carbon black, should be present in a sufficient amount to render the toner composition highly colored. Generally, the pigment particles are present in amounts of from about 1 percent by weight to about 20 percent by weight, and preferably from about 2 to about 10 weight percent based on the total weight of the toner composition; however, lesser or greater amounts of pigment particles can be selected.

When the pigment particles are comprised of magnetites, thereby enabling single component toners in some instances if desired, which magnetites are a mixture of iron oxides ($FeO.Fe_2O_3$) including those commercially available as MAPICO BLACK®, they are present in the toner composition in an amount of from about 10 percent by weight to about 70 percent by weight, and preferably in an amount of from about 10 percent by weight to about 50 percent by weight. Mixtures of carbon black and magnetite with from about 1 to about 15 weight percent of carbon black, and preferably from about 2 to about 6 weight percent of carbon black, and magnetite, such as MAPICO BLACK®, in an amount of, for example, from about 5 to about 60, and preferably from about 10 to about 50 weight percent can be selected.

Colorant includes pigments, dyes, mixtures thereof, mixtures of pigments, mixtures of dyes, and the like.

There can also be blended with the toner compositions external additive particles including flow aid additives, which additives are usually present on the surface thereof. Examples of these additives include colloidal silicas, such as AEROSIL®, metal salts and metal salts of fatty acids inclusive of zinc stearate, aluminum oxides, cerium oxides, and mixtures thereof, which additives are generally present in an amount of from about 0.1 percent by weight to about 10 percent by weight, and preferably in an amount of from about 0.1 percent by weight to about 5 percent by weight. Several of the aforementioned additives are illustrated in U.S. Pat. Nos. 3,590,000 and 3,800,588, the disclosures of which are totally incorporated herein by reference.

With further respect to the toners used in conjunction with the present invention, colloidal silicas, such as AEROSIL®, can be surface treated with the charge additives in an amount of from about 1 to about 30 weight percent and preferably 10 weight percent followed by the addition thereof to the toner in an amount of from 0.1 to 10 and preferably 0.1 to 1 weight percent.

Also, there can be included in the toner compositions low molecular weight waxes, such as polypropylenes and polyethylenes commercially available from Allied Chemical and Petrolite Corporation, EPOLENE N-15® commercially available from Eastman Chemical Products, Inc., VISCOL 550-P®, a low weight average molecular weight polypropylene available from Sanyo Kasei K. K., and similar materials. The commercially available polyethylenes selected have a molecular weight of from about 1,000 to about 1,500, while the commercially available polypropylenes utilized for the toner compositions are believed to have a molecular weight of from about 4,000 to about 5,000. Many of the polyethylene and polypropylene compositions useful in the present invention are illustrated in British Patent No. 1,442,835, the disclosure of which is totally incorporated herein by reference.

The low molecular weight wax materials are optionally present in the toner composition or the polymer resin beads of the present invention in various amounts, however, generally these waxes are present in the toner composition in an amount of from about 1 percent by weight to about 15 percent by weight, and preferably in an amount of from about 2 percent by weight to about 10 percent by weight and may in embodiments function as fuser roll release agents.

Encompassed within the scope of the present invention are colored toner and developer compositions comprised of toner resin particles, carrier particles, charge enhancing additives, and as pigments or colorants red, blue, green, brown, magenta, cyan and/or yellow particles, as well as mixtures thereof. More specifically, with regard to the generation of color images utilizing a developer composition with charge enhancing additives, illustrative examples of magenta materials that may be selected as pigments include, for example, 2,9-dimethyl-substituted quinacridone and anthraquinone dye identified in the Color Index as CI 60710, CI Dispersed Red 15, diazo dye identified in the Color Index as CI 26050, CI Solvent Red 19, and the like. Illustrative examples of cyan materials that may be used as pigments include copper tetra-4-(octadecyl sulfonamido) phthalocyanine, X-copper phthalocyanine pigment listed in the Color Index as CI 74160, CI Pigment Blue, and Anthrathrene Blue, identified in the Color Index as CI 69810, Special Blue X-2137, and the like; while illustrative examples of yellow pigments that may be selected are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33, 2,5-dimethoxy-4-sulfonanilide phenylazo-4'-chloro-2,5-dimethoxy acetoacetanilide, and Permanent Yellow FGL. The aforementioned pigments are incorporated into the toner composition in various suitable effective amounts providing the objectives of the present invention are achieved. In one embodiment, these colored pigment particles are present in the toner composition in an amount of from about 2 percent by weight to about 15 percent by weight calculated on the weight of the toner resin particles.

For the formulation of developer compositions, there are mixed with the toner particles carrier components, particularly those that are capable of triboelectrically assuming an opposite polarity to that of the toner composition. Accordingly, the carrier particles are selected to be of a negative polarity enabling the toner particles, which are positively charged, to adhere to and surround the carrier particles. Illustrative examples of carrier particles include iron powder, steel, nickel, iron, ferrites, including copper zinc ferrites, and the like. Additionally, there can be selected as carrier particles nickel berry carriers as illustrated in U.S. Pat. No. 3,847,604, the disclosure of which is totally incorporated herein by reference particles used the aforementioned coating composition, the coating generally containing terpolymers of styrene, methylmethacrylate, and a silane, such as triethoxy silane, reference U.S. Pat. Nos. 3,526,533, 4,937,166, and 4,935,326, the disclosures of which are totally incorporated herein by reference, including for example KYNAR® and polymethylmethacrylate mixtures (40/60). Coating weights can vary as indicated herein; generally, however, from about 0.3 to about 2, and preferably from about 0.5 to about 1.5 weight percent coating weight is selected.

Furthermore, the diameter of the carrier particles, preferably spherical in shape, is generally from about 50 microns to about 1,000 microns, and in embodiments about 175 microns thereby permitting them to possess sufficient density and inertia to avoid adherence to the electrostatic images during the development process. The carrier component can be mixed with the toner composition in various suitable combinations, however, best results are obtained when about 1 to 5 parts per toner to about 10 parts to about 200 parts by weight of carrier are selected.

The toner composition used in conjunction with the coated carriers can be prepared by a number of known methods including extrusion melt blending the toner resin particles, pigment particles or colorants, and a charge enhancing additive, followed by mechanical attrition. Other methods include those well known in the art such as spray drying, melt dispersion, emulsion aggregation, and extrusion processing. Also, as indicated herein the toner composition without the charge enhancing additive in the bulk toner can be prepared, followed by the addition of charge additive surface treated colloidal silicas.

The toner and developer compositions may be selected for use in electrostatographic imaging apparatuses containing therein conventional photoreceptors providing that they are capable of being charged positively or negatively. Thus, the toner and developer compositions can be used with layered photoreceptors that are capable of being charged negatively, such as those described in U.S. Pat. 4,265,990, the disclosure of which is totally incorporated herein by reference. Illustrative examples of inorganic photoreceptors that may be selected for imaging and printing processes include selenium; selenium alloys, such as selenium arsenic, selenium tellurium and the like; halogen doped selenium substances; and halogen doped selenium alloys.

The toner compositions are usually jetted and classified subsequent to preparation to enable toner particles with a preferred average diameter of from about 5 to about 25 microns, more preferably from about 8 to about 12 microns, and most preferably from about 5 to about 8 microns. Also, the toner compositions preferably possess a triboelectric charge of from about 0.1 to about 2 femtocoulombs per micron as determined by the known charge spectrograph. Admix time for toners are preferably from about 5 seconds to 1 minute, and more specifically from about 5 to about 15 seconds as determined by the known charge spectrograph. These toner compositions with rapid admix characteristics enable, for example, the development of images in electrophotographic imaging apparatuses, which images have substantially no background deposits thereon, even at high toner dispensing rates in some instances, for instance exceeding 20 grams per minute; and further, such toner compositions can be selected for high speed electrophotographic apparatuses, that is those exceeding 70 copies per minute.

Also, the toner compositions, in embodiments, of the present invention possess desirable narrow positive or negative charge distributions, optimal charging triboelectric values, preferably of from about 10 to about 40, and more preferably from about 10 to about 35 microcoulombs per gram as determined by the known Faraday Cage methods with from about 0.1 to about 5 weight percent in one embodiment of the charge enhancing additive; and rapid admix charging times as determined in the charge spectrograph of less than 15 seconds, and more preferably in some embodiments from about 1 to about 14 seconds.

The invention will further be illustrated in the following non limiting Examples, it being understood that the Examples are intended to be illustrative only and that the invention is not intended to be limited to the materials, conditions, process parameters, and the like, recited herein. Parts and percentages are by weight unless otherwise indicated.

EXAMPLE I

Stable Free Radical Mediated Polymerization of Acrylate with Reducing Agent In a 100 ml 3-necked round bottom flask equipped with a condenser, gas inlet and rubber septum was added N-(1-methylbenzyl)-oxy-2,2,6,6-tetramethyl-1-piperidine ( MB-TMP) (0.072 g, 0.0271 mmoles), dextrose (0.16 grams) as a reducing agent, NaHCO$_3$ (0.16 g) as a basic buffer, and n-butylacrylate (25 mL) monomer. The resulting mixture was then deoxygenated by bubbling argon through the suspension followed by heating with a preheated oil bath (to 145° C.). The reaction was stirred for 5 hours resulting in poly(n-butyl acrylate)-TEMPO of Mn=45,537 with polydispersity (PD) of 1.55 and conversion of 65 percent, where PD=Mw/Mn.

EXAMPLE II

Block Copolymerization The poly(n-butyl acrylate)-TEMPO (2.2 grams) of Example I was dissolved in styrene monomer (35 mL) in a 100 mL 3-necked round bottomed flask equipped with a condenser, gas inlet and rubber septum and heated by immersion into a preheated oil bath of 135° C. The reaction was stirred for 2.5 hours and then precipitated into methanol (500 mL). The resulting polymer of poly(n-butyl acrylate-b-styrene) had a MN=104,900 with PD=1.71.

EXAMPLE III

Isoprene Polymerization In a PARR reactor was discharged isoprene (75 mL), N-(1-methylbenzyl)-oxy-2,2,6,6-tetramethyl-1-piperidine (MB -TMP) (0.079 grams), glucose (0.12 grams) and NaHCO$_3$ (0.14 grams). The reactor was purged with argon through the solution for 15 minutes and then heated to 145° C. over a 20 minute interval. This temperature was maintained for 4 hours after which it was cooled and monomer evaporated to yield polyisoprene of Mn=20,573, with a PD=1.33 and conversion of 25 percent.

EXAMPLE IV

Block Copolymerization To a 3 necked round bottom flask was added n-butyl acrylate (25 mL), glucose (0.119 grams), NaHCO$_3$ (0.139 grams) and a polystyrene TEMPO terminated (2.068 g, Mn=6,000). This was purged with argon gas bubbling through the solution for 25 minutes. Then the flask was heated by immersion into a preheated oil bath of 145° C. After 5 hours, poly( styrene-b-n-butyl acrylate) was obtained with Mn=29,594, and PD=2.18 and conversion of 62 percent.

EXAMPLE V

Isoprene Polymerization In a PARR pressurized steel reactor was discharged isoprene (75 mL), MB-TMP (0.072 g) and benzoin (0.182 g). This solution was purged with argon and then heated to 145° C. The internal pressure rose to 198 p.s.i. After 6 hours the pressure had fallen to 120 p.s.i. and the reaction was cooled. Polyisoprene was obtained with MN=55,000 and PD=1.55 and conversion of 36.9 percent.

COMPARATIVE EXAMPLE V

As a comparison, Example V was repeated with the exception that no reducing additive was used with the result that there was generated a polyisoprene of Mn=3,000 and conversion of 5 percent was obtained.

EXAMPLE VI n-Butyl Acrylate Polymerization with Reducing Agent In a 100 mL 3-necked round bottom flask equipped with a condenser, gas inlet and rubber septum was added N-(1-methylbenzyl)-oxy-2,2,6,6-tetramethyl-1-piperidine (MB-TMP) (0.072 g, 0.0271 mmoles), dextrose (0.5 g), NaHCO$_3$ (0.5 grams) and n-butylacrylate (25 mL). This was then deoxygenated by bubbling argon through the suspension followed by heating with a preheated oil bath (to 115° C.). The reaction was stirred for 7 hours resulting in poly(n-butyl acrylate)-TEMPO of MN=37,555 with PD of 1.92 and conversion of 36.4 percent.

EXAMPLE VII n-Butylacrylate Polymerization with Reducing Agent To a round bottomed flask equipped with a reflux condenser, thermometer and gas inlet tube was added BPO (0.1 grams, 0.413 mmoles), stable free radical agent 4-HO-TEMPO (0.097 grams, 0.563 moles), acetol (0.2 mL, 2.69 mmoles)

as a reducing agent, and n-butyl acrylate (25 mL) monomer. This solution was deoxygenated for 10 minutes by bubbling argon through the solution and then heated by immersion into a hot oil bath (145° C.). The reaction was stirred for 8.5 hours to yield 4-HO-TEMPO terminated poly(n-butyl acrylate) of Mn=36,297 with a polydispersity of 1.65 and conversion of 56 percent.

EXAMPLE VIII n-Butylacrylate Polymerization with Reducing Agent To a round bottomed flask equipped with a reflux condenser, thermometer and gas inlet tube was added free radical initiator benzoyl peroxide(BPO) (0.2 grams, 0.83 mmoles), stable free radical agent 4-HO-TEMPO (0.171 grams, 0.993 mmoles), hydroxybutanone (0.8 mL, 9.1 mmoles) as a reducing agent, and n-butyl acrylate (25 mL) monomer. This solution was deoxygenated for 10 minutes by bubbling argon through the solution and then heated by immersion into a hot oil bath (145° C.). The reaction was stirred for 7.5 hours to yield 4-HO-TEMPO terminated poly(n-butyl acrylate) of MN=47,488 with a polydispersity of 2.12 and conversion of 80 percent.

EXAMPLE IX

Magnetic Toner Preparation and Evaluation A polymer resin (74 weight percent of the total mixture) obtainable by stable free radical polymerization of mixtures of styrene and butadiene may be melt extruded with 10 weight percent of REGAL 330® carbon black and 16 weight percent of MAPICO BLACK® magnetite at 120° C., and the extrudate pulverized in a Waring blender and jetted and classified to 8 micron number average sized particles as measured by a Coulter counter. A positively charging magnetic toner may be prepared by surface treating the jetted toner (2 grams) with 0.12 gram of a 1:1 weight ratio of AEROSIL R972® (Degussa) and TP-302 a naphthalene sulfonate and quaternary ammonium salt (Nachem/Hodogaya Sl) charge control agent.

Developer compositions may then be prepared by admixing 3.34 parts by weight of the aforementioned toner composition with 96.66 parts by weight of a carrier comprised of a steel core with a polymer mixture thereover containing 70 percent by weight of KYNAR®, a polyvinylidene fluoride, and 30 percent by weight of polymethyl methacrylate; the coating weight being about 0.9 percent. Cascade development may be used to develop a Xerox Model D photoreceptor using a "negative" target. The light exposure may be set between 5 and 10 seconds and a negative bias used to dark transfer the positive toned images from the photoreceptor to paper.

Fusing evaluations may be carried out with a Xerox Corporation 5028® soft silicone roll fuser, operated at 7.62 cm (3 inches) per second.

The actual fuser roll temperatures may be determined using an Omega pyrometer and was checked with wax paper indicators. The degree to which a developed toner image adhered to paper after fusing is evaluated using a Scotch® tape test. The fix level is expected to be excellent and comparable to that fix obtained with toner compositions prepared from other methods for preparing toners. Typically greater than 95 percent of the toner image remains fixed to the copy sheet after removing a tape strip as determined by a densitometer. Alternatively, the fixed level may be quantitated using the known crease test, reference the aforementioned U.S. Pat. No. 5,312,704.

Images may be developed in a xerographic imaging test fixture with a negatively charged layered imaging member comprised of a supporting substrate of aluminum, a photogenerating layer of trigonal selenium, and a charge transport layer of the aryl amine N,N'-diphenyl-N,N'-bis(3-methylphenyl)1,1'-biphenyl-4,4'-diamine, 45 weight percent, dispersed in 55 weight percent of the polycarbonate MAKROLON®, reference U.S. Pat. No. 4,265,990, the disclosure of which is totally incorporated herein by reference; images for toner compositions prepared from the copolymers derived from for example, Example XI are expected to be of excellent quality with no background deposits and of high resolution over an extended number of imaging cycles exceeding, it is believed, about 75,000 imaging cycles.

Other toner compositions may be readily prepared by conventional means from the pigmented thermoplastic resins particles obtained from the improved polymerization processes of the present invention, including colored toners, single component toners, multi-component toners, toners containing special performance additives, and the like.

In embodiments, the processes of the present invention can be selected for and employed in preparing polymeric particulate materials including, but not limited to, crystalline, semicrystalline, and amorphous polymeric materials, and mixtures thereof.

Other modifications of the present invention may occur to one of ordinary skill in the art based upon a review of the present application and these modifications, including equivalents thereof, are intended to be included within the scope of the present invention.

What is claimed is:

1. A process for the preparation of a resin comprising:
heating a mixture of at least one free radical polymerizable monomer, a free radical initiator compound, a stable free radical compound, and a reducing agent of the tautomeric formula

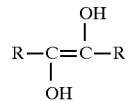

wherein R is independently selected from the group consisting of hydrogen, alkyl groups with from 1 to about 25 carbon atoms, alkylene groups with from 2 to about 25 carbon atoms, aryl groups with from about 6 to about 25 carbon atoms, heteroaryl groups with from about 5 to about 25 carbon atoms; alkoxyl groups with from 1 to about 25 carbon atoms, and mixtures thereof.

2. A process in accordance with claim 1 wherein there results a thermoplastic resin or thermoplastic resins with a narrow polydispersity of from about 1.1 to about 2.2 and in high conversion of from about 50 to 100 percent, and wherein at least one free radical polymerizable monomer is from one to about five.

3. A process in accordance with claim 1, wherein the reducing agent contains an enolizable alpha-hydroxy carbonyl moiety or is an attenuated hydride compound, and mixtures thereof, and wherein the reducing agent maintains the concentration of the stable free radical agent at low levels to overcome the excess inhibitory effect of the stable free radical compound.

4. A process in accordance with claim 1, wherein the reducing agent is a reducing sugar compound capable of reducing Fehling's solution.

5. A process in accordance with claim 1, wherein the reducing agent is a benzoin of the formula $C_6H_5-(C=O)-CH(OH)-C_6H_5$.

6. A process in accordance with claim 1, further comprising adding a base or buffering salt compound selected from the group consisting of Group IA and IIA metal halides, metal carbonates and bicarbonates, phosphates, sulfates, hydroxides, acetates, borates, and mixtures thereof.

7. A process in accordance with claim 1, wherein the free radical initiator is water soluble and is selected from the group consisting of sulfites, peroxides, peroxydisulfates, azo compounds, and mixtures thereof.

8. A process in accordance with claim 1, wherein the monomer is selected from the group consisting of acrylate compounds, alkacrylate compounds, styrene compounds, conjugated diene compounds, unconjugated diene compounds, conjugated olefin-carbonyl compounds, 9-vinyl carbazole compounds, vinyl chloride compounds, vinyl acetate compounds, and mixtures thereof.

9. A process in accordance with claim 1, wherein from about 2 to about 10 different monomers are polymerized.

10. A process in accordance with claim 1, wherein the stable free radical compound is selected from the group consisting of 2,2,5,5-tetramethyl-1-pyrrolidinyloxy compounds, 2,2,6,6-tetramethyl-1-piperidinyloxy compounds, 4,4-dimethyl-3-oxazolinyloxy compounds, di-tertiary alkyl substituted nitroxide compounds, and mixtures thereof.

11. A process in accordance with claim 1, wherein the heating is at a temperature of from about 100° to about 200° C.

12. A process in accordance with claim 1, wherein the heating is at a temperature of from about 120° to about 165° C. for from about 1 to about 10 hours, the monomer to polymer conversion is from about 65 to 95 percent, and the resin product polydispersity is from about 1.3 to about 2.0.

13. A process in accordance with claim 1 wherein the weight average molecular weight ($M_w$) of the resulting resin is from 3,000 to about 200,000 for homopolymers and of from about 5,000 to about 600,000 for copolymers.

14. A process in accordance with claim 1 wherein the weight ratio of free radical initiator to monomers is from about 0.001:100 to 1.0:1.0.

15. A process in accordance with claim 1 wherein the mole ratio of reducing agent to free radical initiator is from about 1:1 to about 10:1.

16. A process for the preparation of a thermoplastic resin, or thermoplastic resins comprising:

heating a mixture of at least one free radical polymerizable monomer, a free radical initiator adduct compound containing a covalently bonded stable free radical agent, and a reducing agent, wherein there results a thermoplastic resin or thermoplastic resins with a narrow polydispersity, wherein the reducing agent additive possesses ene-diol character of the formula

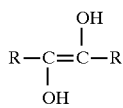

wherein R is independently selected from hydrogen, alkyl groups with from 1 to about 25 carbon atoms, alkylene groups with 2 to about 25 carbon atoms, aryl groups with from about 6 to about 25 carbon atoms, heteroaryl groups with from about 5 to about 25 carbon atoms, alkoxyl groups with from 1 to about 25 carbon atoms, and combinations thereof.

17. A process in accordance with claim 16, wherein the free radical initiator compound is of the formula R'—SFR, wherein R' is an oligomeric compound comprised of from about 1 to about 30 monomer units and optionally a covalently bonded free radical initiator compound, and wherein —SFR is a covalently bound stable free radical end group.

18. A process in accordance with claim 16, wherein the free radical initiator compound R'—SFR is of the formula

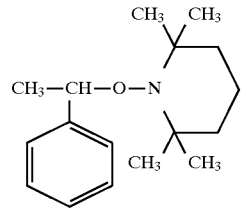

or of the formula

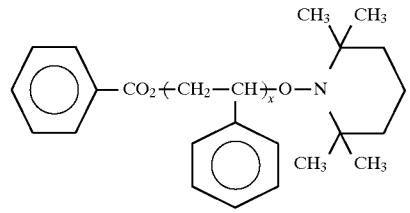

where x is an integer of from 1 to about 30.

19. A process in accordance with claim 16 wherein the covalently bonded stable free radical end group —SFR arises from a compound selected from the group consisting of 2,2,5,5-tetramethyl-1-pyrrolidinyloxy compounds, 2,2,6,6-tetramethyl-1-piperidinyloxy compounds, 4,4-dimethyl-3-oxazolinyloxy compounds, di-tertiary alkyl substituted nitroxide compounds, and mixtures thereof.

20. A process in accordance with claim 16, further comprising including a sodium bicarbonate buffering compound in an amount of from about 0.1 weight percent to about 3 weight percent based on the total weight of the reducing agent.

21. A process for the preparation of a thermoplastic resin, or thermoplastic resin comprising:

heating a mixture of alkyl acrylate free radical polymerizable monomer and non-acrylate free radical polymerizable monomer, a free radical initiator adduct compound of the formula

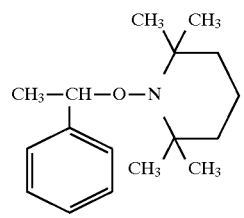

and glucose as a reducing agent additive, wherein there results a thermoplastic resin copolymer of the alkyl acrylate and non acrylate monomers with a narrow polydispersity of from about 1.1 to about 2.2 and in high conversion of from about 50 to 100 percent.

22. A process for the preparation of a block or multiblock copolymer thermoplastic resin comprising:

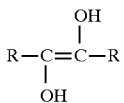

heating a mixture of a free radical polymerizable monomer, a free radical initiator compound, a stable free radical compound, and a reducing agent, to form a mixture containing a first intermediate product resin, and wherein the reducing agent additive possesses ene-diol character of the formula

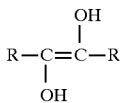

wherein R is independently selected from hydrogen, alkyl groups with from 1 to about 25 carbon atoms, alkylene groups with 2 to about 25 carbon atoms, aryl groups with from about 6 to about 25 carbon atoms, heteroaryl groups with from about 5 to about 25 carbon atoms, alkoxyl groups with from 1 to about 25 carbon atoms, and combinations thereof;

optionally cooling the resulting mixture;

optionally isolating said first intermediate product resin from the mixture;

adding to said first intermediate product resin a second mixture comprised of at least one free radical polymerizable monomer compound, and optionally a reducing agent, wherein said polymerizable monomer compound of said second mixture is different from said polymerizable monomer or monomers of said first mixture, to form a combined second mixture;

heating said combined second mixture to form a third mixture comprised of a block copolymer thermoplastic resin comprised of a first product resin formed from said first intermediate product resin and added said second monomer;

cooling the resulting third mixture;

optionally isolating the resin from said third mixture; sequentially repeating adding, heating and cooling, N times, wherein N represents a number, to form a fourth mixture containing a multiblock copolymer thermoplastic resin or resins having N+2 blocks and wherein N is the number of times said sequence is repeated;

optionally isolating said multiblock copolymer thermoplastic resin from said fourth mixture; and optionally washing and drying said multiblock copolymer thermoplastic resin.

23. A process in accordance with claim 22, wherein N is from 1 to about 20.

* * * * *